United States Patent [19]

Bernitz et al.

[11] Patent Number: 5,739,644

[45] Date of Patent: Apr. 14, 1998

[54] DISCHARGE LAMP TYPICALLY A SODIUM HIGH-PRESSURE DISCHARGE LAMP, FROM AN A-C POWER NETWORK

[75] Inventors: Franz Bernitz, Unterhaching; Andreas Huber, Maisach; Guenther Hirschmann, Munich; Michael Boenigk, Berlin, all of Germany

[73] Assignee: Patent-Treuhand-Gesellschaft F. Elektrische Gluehlampen mbH, Munich, Germany

[21] Appl. No.: 399,750

[22] Filed: Mar. 7, 1995

[30] Foreign Application Priority Data

Mar. 11, 1994 [DE] Germany .......................... 44 08 314.9
Apr. 20, 1994 [DE] Germany .......................... 44 13 826.1

[51] Int. Cl.⁶ .................................................. H05B 41/36
[52] U.S. Cl. ............................ 315/289; 315/DIG. 7; 315/307; 315/243; 315/209 R
[58] Field of Search ................... 315/DIG. 7, 307, 315/174, 246, 289, 291, 243, 219, 209 R

[56] References Cited

U.S. PATENT DOCUMENTS

| | | | |
|---|---|---|---|
| 4,734,624 | 3/1988 | Nagase et al. | 315/243 |
| 5,349,273 | 9/1994 | Pacholok | 315/307 |
| 5,365,151 | 11/1994 | Spiegel | 315/209 R |
| 5,373,215 | 12/1994 | Steinkraus, Jr. | 315/200 R |
| 5,481,162 | 1/1996 | Boenigk et al. | 315/307 |
| 5,483,126 | 1/1996 | Boenigk et al. | 315/307 |

FOREIGN PATENT DOCUMENTS

| | | |
|---|---|---|
| 0 477 587 A1 | 4/1992 | European Pat. Off. . |
| 36 36 901 | 5/1988 | Germany . |
| 40 05 776 A1 | 9/1990 | Germany . |
| WO 88/09108 | 11/1988 | WIPO . |

*Primary Examiner*—Robert Pascal
*Assistant Examiner*—Arnold Kinkead
*Attorney, Agent, or Firm*—Frishauf, Holtz, Goodman, Langer & Chick, P.C.

[57] ABSTRACT

To provide for effective control of a discharge lamp, typically, a sodium high pressure discharge lamp, which operates in two phases, namely, a power pulse phase, followed by a holding phase, without extensive and complex electronic circuitry, two individual oscillator systems are provided, one for each phase; the oscillator systems include a first power burst oscillator formed as a first half bridge by two transistors (T1, T2), and an individual connecting current limiting inductance (L1) to the lamp (E), and a second oscillator including a two-transistor second half bridge (T3, T4) and an individual current limiting inductance (L2) coupled to the lamp. The respective oscillators are controlled, in a closed control loop, by a burst generator (BG) and a holding pulse generator (SG), each of which provide their signals to a logic circuit (LK) which provides for exclusive control of the respective first or second half bridge. A lamp voltage sensing circuit (C4, R2) taps lamp operating voltage, which is compared with a command signal to control through a repetition frequency control generator (WG), the recurrence rate of the bursts from the power bursts generator (BG). The lamp starting circuit (4) can also be controlled from the sensed signal by comparison with a reference in a second comparator (K) and suitably applied to an ignition circuit by an ignition monitoring logic. A pair of electrolytic capacitors of essentially the same value is connected across the d-c supply and their midjunction to the lamp.

25 Claims, 3 Drawing Sheets

DISCHARGE LAMP TYPICALLY A SODIUM HIGH-PRESSURE DISCHARGE LAMP, FROM AN A-C POWER NETWORK

Reference to related applications, the disclosures of which are hereby incorporated by reference:

U.S. Ser. No. 08/182,597, filed Jan. 18, 1994, Boenigk et al., U.S. Pat. No. 5,483,126;

U.S. Ser. No. 08/182,596, filed Jan. 18, 1994, Boenigk et al., U.S. Pat. No. 5,481,162.

PCT/EP 92/1566; WO93/01695, U.S. Pat. No. 5,365,151, Spiegel et al.

FIELD OF THE INVENTION

The present invention relates to a pulsed operating circuit for a discharge lamp, typically a sodium high-pressure discharge lamp, in which the pulses supplied to the discharge lamp can be controlled. The pulses are of two types: (1) groups or bursts of power pulses of high intensity and (2) holding pulses of low intensity between the bursts of power pulses.

BACKGROUND

Operating discharge lamps from a pulsed supply has many advantages; the supply circuit, however, can be complex and places particularly high requirements on electronic components in the power stage of the supply. U.S. application Ser. No. 08/182,596, now U.S. Pat. No. 5,481,162, Boenigk et al., the disclosure of which is hereby incorporated by reference, assigned to the assignee of the present application, describes in detail that optimum adjustment of the light data relating to the lamp, such as arc voltage, light output, color temperature and color rendition index can be optimally controlled by controlling the vapor pressure of the lamp, for example, a sodium high-pressure discharge lamp. The impedance of the plasma within the discharge lamp can be utilized as a controlled parameter for the vapor pressure. For stabilized operation of the lamp, it is then only necessary to so control the output power or energy from the current supply source that the impedance of the lamp will assume the desired value.

The impedance of the lamp can be determined by calculating the quotient of lamp voltage and lamp current. If the lamp is operated with bursts of power pulses and intervening holding pulses, the respective values can be taken during the power pulse phase, as well as during the holding pulse phase of operation of the lamp.

If the current supply is stabilized with respect to supply network voltage variations, and when the output impedance is known or predetermined, it may only be necessary to regulate the current through, or the voltage at, the lamp to a predetermined command value, which will be representative of the optimum value of vapor pressure and, hence, the color rendition characteristics and light output of the lamp, as well as its operating or arc or running voltage. If the lamp is operated with pulsed power with a power supply which has a no-load voltage stabilization with respect to supply network voltages, and with a known output impedance, a controlled parameter may be suitable which includes one of the values of pulse voltage, pulse current, holding phase voltage or holding phase current. The lamp power can then be changed selectively by either changing the widths of the power pulses or the spacing of the power pulses, and/or the power supplied during the holding phase.

It has been found, see the referenced application Ser. No. 08/182,597, now U.S. Pat. No. 5,483,126, Boenigk et al., assigned to the assignee of the present invention application, the disclosure of which is hereby incorporated by reference, that the color temperature of the sodium high-pressure discharge lamp can be freely selected between 2,500° K and 3,000° K or even more by changing the instantaneous power upon pulsed operation of a sodium high-pressure discharge lamp, while the power is supplied during the power pulse phase.

The international application of PCT/EP92/1566, WO93/01695, U.S. Pat. No. 5,365,151, describes an accessory circuit for pulsed operation of a gas discharge lamp. The accessory or ballast circuit essentially has an oscillating full-wave or half-wave bridge circuit and a single reactance; the oscillating circuit may be self-triggered or self-oscillating or remotely controlled. Such circuits require change of the frequency of the bridge circuit to match the current for the different operating phases of the lamp, namely for the holding phase and for the power pulse phase, so that the lamp can be appropriately operated during the respective operating phases. This is particularly important for sodium high-pressure discharge lamps. The lamp current amplitude between the holding phase and the pulsed phase can vary by a factor up to about 100. Thus, such a half-bridge or full-bridge circuit can be realized only with substantially complex circuitry, and high costs. The circuit should, further, provide for high flexibility with respect to operating currents and operating frequency. This can hardly be carried out by frequency scanning or frequency control in only one bridge circuit which furnishes the energy during both the holding phase and the power pulse phase, due to the vast differences in power requirements of the lamp during these different phases.

THE INVENTION

It is an object to provide a pulsed operating system and a circuit therefor which does not have the disadvantages of prior art systems, while still providing numerous degrees of freedom with respect to the selection of operating currents and frequencies for pulsed operation of discharge lamps, particularly sodium high-pressure discharge lamps. The circuit, additionally, should be simple, inexpensive, and permit simple and inexpensive change of color temperature of the lamp. The lamp should operate quietly, so that acoustic disturbances during operation are effectively suppressed.

Briefly, the circuit uses two separate oscillators, one providing bursts of power pulses to the lamp; the other provides holding or "keep alive current" pulses in the intervals between succeeding bursts of power pulses. The holding pulses insure that the lamp keeps burning at low power. The lamp, of course, is provided with a starting circuit. The power pulses are derived from a controlled pulse generator which generates bursts of essentially rectangular control signals of predetermined pulse duration. To control the characteristics of the power pulses for the lamp by controlling power transistors of the first oscillator, a holding pulse generator continuously generates essentially rectangular control signals, of preselected pulse duration, to control the characteristics of the holding pulses for the lamp by controlling the second oscillator during the pauses between the power pulses. A logic circuit coupled to the burst generator and a holding pulse generator interlocks the respective pulses so that the first and second oscillators which actually supply the lamp will operate sequentially.

In accordance with a feature of the invention, a sensing circuit is coupled to the first or power pulse half-bridge oscillator, and deriving a sensed signal representative of the voltage applied to the lamp, supplied by the respective oscillator. This sensed signal is then connected in a feedback loop including, preferably, a sample and hold circuit and a memory, a comparator for comparison with a command input value and a integral controller to, in turn, control the repetition frequency of the bursts of the burst generator which, in effect, is formed by the first oscillator providing the power pulses.

The lamp, thus, can be controlled as discovered earlier, see the referenced application Ser. No. 08/182596, Boenigk et al., now U.S. Pat. No. 5,481,162, filed Jan. 18, 1994, that the energy supplied, and thus the characteristics which render the lamp so useful, such as, for example, high light output, color rendition, and the like, are proportional to lamp voltage, with a predetermined lamp current.

The control circuit for the first or power oscillator, preferably includes a burst generator which generates a control signal for the pulse phase. A continuously oscillating holding phase generator provides the control signals for the holding phase. The repetition frequency control generator controls the length of the pauses between sequential pulse phases or, in effect, the temporal spacing of the bursts of power pulses.

The signals generated by the various groups of circuits or circuitry are coupled and interconnected by a logic circuit which provides the appropriate signals to terminals or connectors to the transistors in the actual power supply, that is, the first and second power oscillators. The logic circuit is so arranged that during the holding phase, the signal applied to the transistors generating the power pulses is zero or null; during the pulse phase operation, the signal applied to the transistors in the second oscillator, designed for the holding current supply, will be zero or null.

During the holding phase, a voltage sensing circuit connected to the midpoint between the two transistors for the pulse phase senses a voltage proportional to lamp voltage for use in a control loop; at a predetermined time instant, which, for example, is defined by a sample-and-hold circuit, and occurring between power pulses, the voltage is compared with a command voltage. The command voltage is so set that it insures optimal operation of the sodium high-pressure discharge lamp. The actual and command voltage are compared, for example, in a comparator or subtracting circuit, and if the actual voltage value deviates from the command voltage value, the burst repetition frequency control generator is caused to change frequency, e.g. via an integral controller, so that the energy supplied to the lamp will be changed. Change in energy causes a change in lamp voltage, so that, in effect, the optimum operating condition is re-established.

The power burst generator, as well as the holding pulse generator, each are designed to provide for variation in the length of the respective control signals. The number of signals in any one burst, and forming a group of signals, likewise can be varied. By splitting the control generators for the holding phase and for the power pulse phase, it is additionally possible to change the color temperature of sodium high-pressure discharge lamps between 2,500° K and 3,000° K, and even more, without changing the color rendition index. Thus, the color temperature can be controlled by changing the number of control signals occurring during the pulse phase, and changing the length of the control signals and/or the length of the control signals for the holding phase and matching the instantaneous voltage to a suitably changed command voltage, as generally described, for example, in the above-noted and referenced application Ser. No. 08/182,596, Boenigk et al. Preferably, both the power burst generator, as well as the holding generator, are formed by a controlled oscillator. An oscillation counter is preferably coupled to the power burst generator. A logic circuit interconnects the power burst generator and the holding pulse generator.

The repetition frequency control generator preferably is a controllably frequency oscillator. The sample and hold element preferably is formed by a control switch coupled to a memory. The integral controller may be an operational amplifier, or the integrating function can be realized by programming in which the integral controller is a digital device controlled by a suitable integrating algorithm.

In accordance with another feature of the invention, an additional comparator is preferably provided which is coupled, on the one hand, to the sensing circuit and over a logic circuit to a control terminal on the pulse ignition circuit in the power supply and, typically, the power pulse oscillator and, further, with an input to the sample-and-hold circuit. This permits monitoring of ignition of a sodium high-pressure discharge lamp. The voltage applied to the lamp is compared in the comparator with a reference voltage. If the reference voltage is exceeded, the pulse ignition circuit is activated in the power circuit arrangement by closing of a switch.

The circuit permits completely independent control of color temperature and color rendition index and, further, power output control of a sodium high-pressure discharge lamp, as described in the above referred to and referenced application Ser. No. 08/182,596, Boenigk et al., without essentially affecting the color temperature. This is a highly desirable feature since it permits changing of the power output of the sodium high-pressure discharge lamp when used in outdoor illumination between a high level and, for example, a low level during night off-hours when a lower level of illumination suffices than earlier. The lamp power can be controlled to, for example, half of rated or full power.

The power supply circuit, an accordance with the feature of the invention, uses two parallel connected half bridges or push-pull converters which are independently and individually controlled. Each half bridge has its own individual current limiting inductance associated therewith. This permits independent control of the power pulse operating phase of the lamp and the holding phase thereof. Additionally, it permits pulse operation which can be readily and freely matched to the requirements of the particular lamp with which it is used. There are no limitations, for example, if it is decided to change the color temperature of the light output from a sodium high-pressure discharge lamp within a range of, for example, between about 2,500° K and 3,000° K.

The circuit employs a capacitive reactance connected to the lamp. In accordance with a feature of the invention, this capacitive reactance is formed by two serially connected capacitors defining a common junction therebetween. Both capacitors are, in turn, connected in parallel to the transistors of the half bridges. This arrangement, of two serially connected capacitors, has substantial advantages. It functions similar to the customary smoothing capacitor as an energy buffer while current supply goes through zero or null. In addition, however, the two capacitors also function as coupling capacitors. These coupling capacitors in the circuit will provide a voltage level so that the load, that is, the lamp can be operated in alternating current mode. The two capacitors, preferably, have equal capacity values so that the transistors to which they are connected will operate symmetrically.

Preferably, the two capacitors are formed as electrolytic capacitors. This has an advantage over customarily used wound foil capacitors since electrolytic capacitors are completely noiseless upon change of current; wound foil capacitors, which are highly loaded, generate audible noise by electrostriction. Electrolytic capacitors, additionally, have a highly desirable energy storage-space factor, i.e. with respect to the volume thereof.

The circuit includes a pulse ignition circuit, integrated in the power half-bridge circuit, to start the lamp. This can be readily incorporated within the circuit so that external ignition circuits with external ignition current supply need not be used. The pulse ignition circuit, preferably, includes the series circuit of a spark gap or of a semi-conductor, for example, a SIDAC, that is a bi-directional diode thyristor, a capacitor and an inductance. The serial pulse circuit is connected with the positive input of the double half bridge and over a resistor and a controlled switch with the negative input of the double half bridge. The winding is wound on the current limiting inductance of that half bridge which generates the power pulses. This permits a very simple introduction of the pulse ignition voltages into the power circuit of the overall network.

The d-c supply voltage for the supply circuit for the lamp, connected to the input of the double half bridge, in the simplest manner, is merely a bridge rectifier. If the double half bridge, for ignition and operation of the discharge lamp, requires a different voltage than that available from a power network then, preferably, the supply circuit, besides the bridge rectifier, includes a voltage step-up circuit or boost converter, preferably so constructed that the reflected impedance to the power network results in essentially sinusoidal current being supplied to the lamp and the associated circuit.

Utilizing a double half bridge has the substantial advantage that a center terminal between two transistors of the half bridge, providing the power pulses during the pulse phase, permits deriving a voltage proportional to lamp voltage which can be used as a sensing voltage to control, in a loop, the overall system, as described above. Arranging a sensing circuit in this form is simple, while insuring optimum operation of the discharge lamp.

DRAWINGS

DETAILED DESCRIPTION

Figure 2:
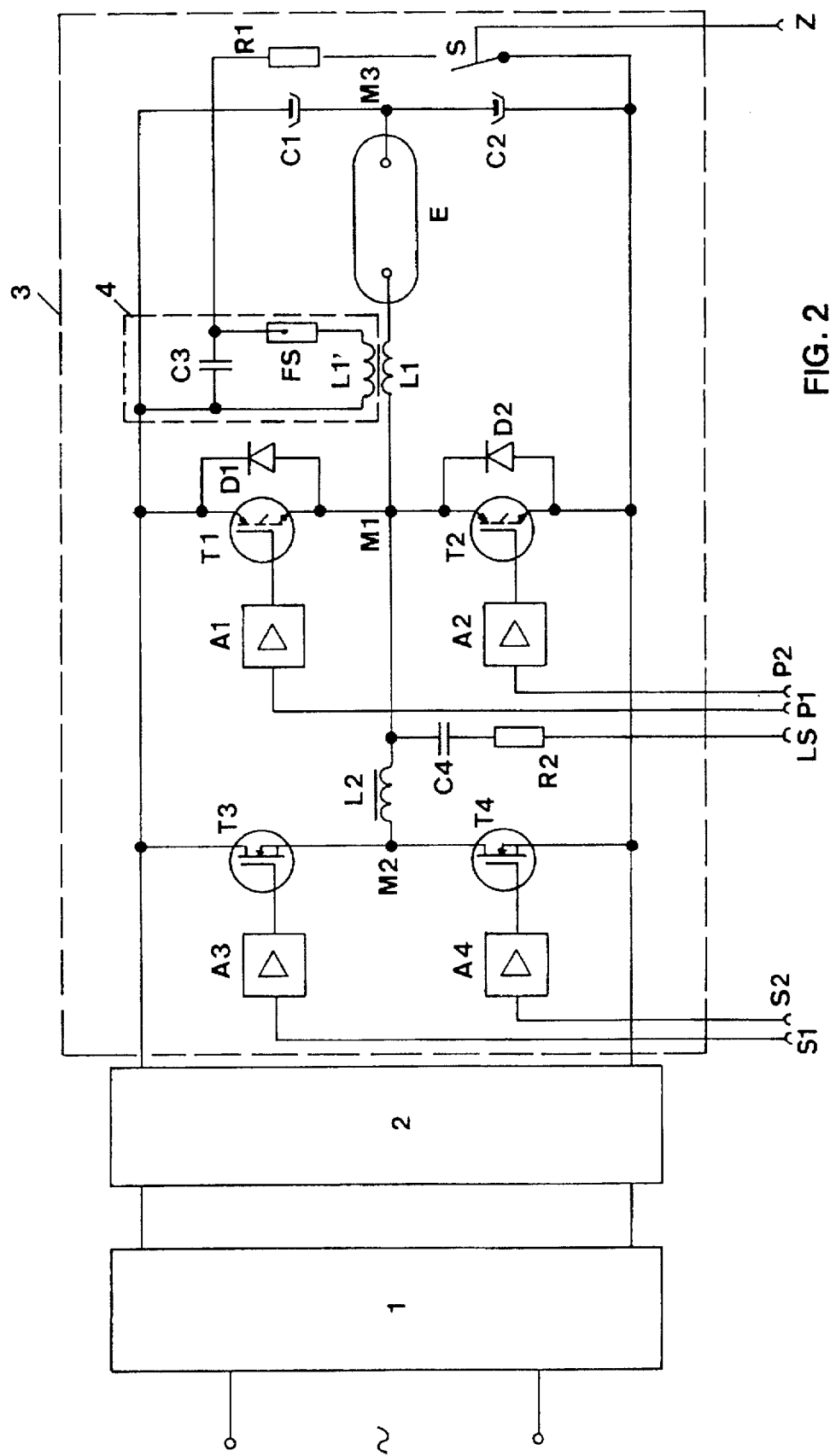
FIG. 2 is a detailed diagram illustrating the power supply circuit and the two oscillators supplying the lamp during respective operating phases.

Referring first to FIG. 2, which is a highly simplified circuit arrangement for pulse operation of a sodium high pressure discharge lamp. In the example selected, the lamp E has a nominal rating of 80 W.

The circuit is adapted for connection to an a-c power supply and has, first, a radio noise suppression filter 1 and a generator 2 to generate a direct current voltage of, for example, 420V.

In accordance with a feature of the invention, the d-c voltage is supplied to a double half bridge 3, into which, in accordance with the preferred feature, a pulse ignition circuit 4 is integrated.

The radio noise suppression filter 1 is of conventional construction and need not be described in detail. The d-c voltage generator 2, as is customary, contains a rectifier bridge and a voltage step-up circuit or boost converter, as well known; any conventional circuit is suitable. It provides a stabilized d-c voltage of 420V.

In accordance with another feature of the invention, the double half bridge 3 has two individually controlled, individually operating half-bridge oscillating circuits. A first half bridge includes two serially connected power transistors T1, T2 each bridged by a free-wheeling diode D1, D2. The two transistors are controlled by control circuits A1, A2 which, in turn, are controlled from an external control apparatus, see FIG. 1, connected to control terminals P1, P2. The control circuits A1, A2 are conventional and need not be described in detail.

The second half bridge is formed by two serially connected metal oxide silicone-field effect transistors (MOS-FET) T3, T4 being connected in parallel across the output of the generator 2. The transistors T3, T4 generate the alternating energy for the holding operating phase of the lamp E. The transistors T3, T4 have their own individual control circuits A3, A4 which, in turn, are controlled externally from a control unit—see FIG. 1—over the holding current terminals S1, S2.

In accordance with a feature of the invention, two electrolytic capacitors of equal capacitive value C1, C2 are connected in parallel to the first half bridge T1, T2.

A current limiting inductance L2 is connected between the junctions M2, M1. Junction M2 is the center terminal between the two MOS-FET transistors T3, T4, and junction M1 is the center connection between the two pulse power transistors T1, T2. An inductance L1 is connected between the center terminal M1 and the center terminal M3 of the two capacitors C1, C2. Inductance L1, which is serially connected with the lamp E, forms a current limiting inductance for the power pulse phase of the sodium high pressure discharge lamp E.

In accordance with a feature of the invention, the pulse ignition circuit 4 is formed by the series circuit of a capacitor C3, a winding L1', wound on the same core as the inductance L1, and a spark gap path FS. This series circuit is connected, on one hand, with the positive input of the double half bridge 3 and, on the other, through a resistor R1 and a controlled switch S, with the negative input of the double half bridge 3. Ignition voltage to the lamp is obtained by the additional winding L1' wound on the current limiting inductance L1. An external connection Z permits control of the switch S so that the ignition circuit 4 can be controlled externally.

A sensing signal representative of lamp voltage can be obtained at terminal LS. This terminal is connected through a resistor R2 and a capacitor C4 to the junction M1. When the transistors T1, T2 are controlled to be OFF and the holding phase of the lamp is active, a voltage representative of lamp voltage is obtained at terminal LS.

Suitable values of circuit components for pulsed operation of an 80 W sodium high-pressure discharge lamp are as follows:

T1,T2: IGBT 30 A, 600V
T3,T4: BUZ 74 A, 400V
D1,D2: Diode 3 A, 600V
L1: 85 µH
L2: 2.3 mH
C1,C2: 150 µF, 250V
R1: 100 kΩ

C3: 0.33 µF, 400V
FS: KAS 03X, 350V
L1': 0.5 µH

Splitting up the power supply for the lamp into two half bridges, each of which can be separately controlled and having their own individual functions and differently dimensioned transistors, permits use of a very simple control system in which the respective control elements can be easily interconnected by a simple logic circuit.

Figure 1:
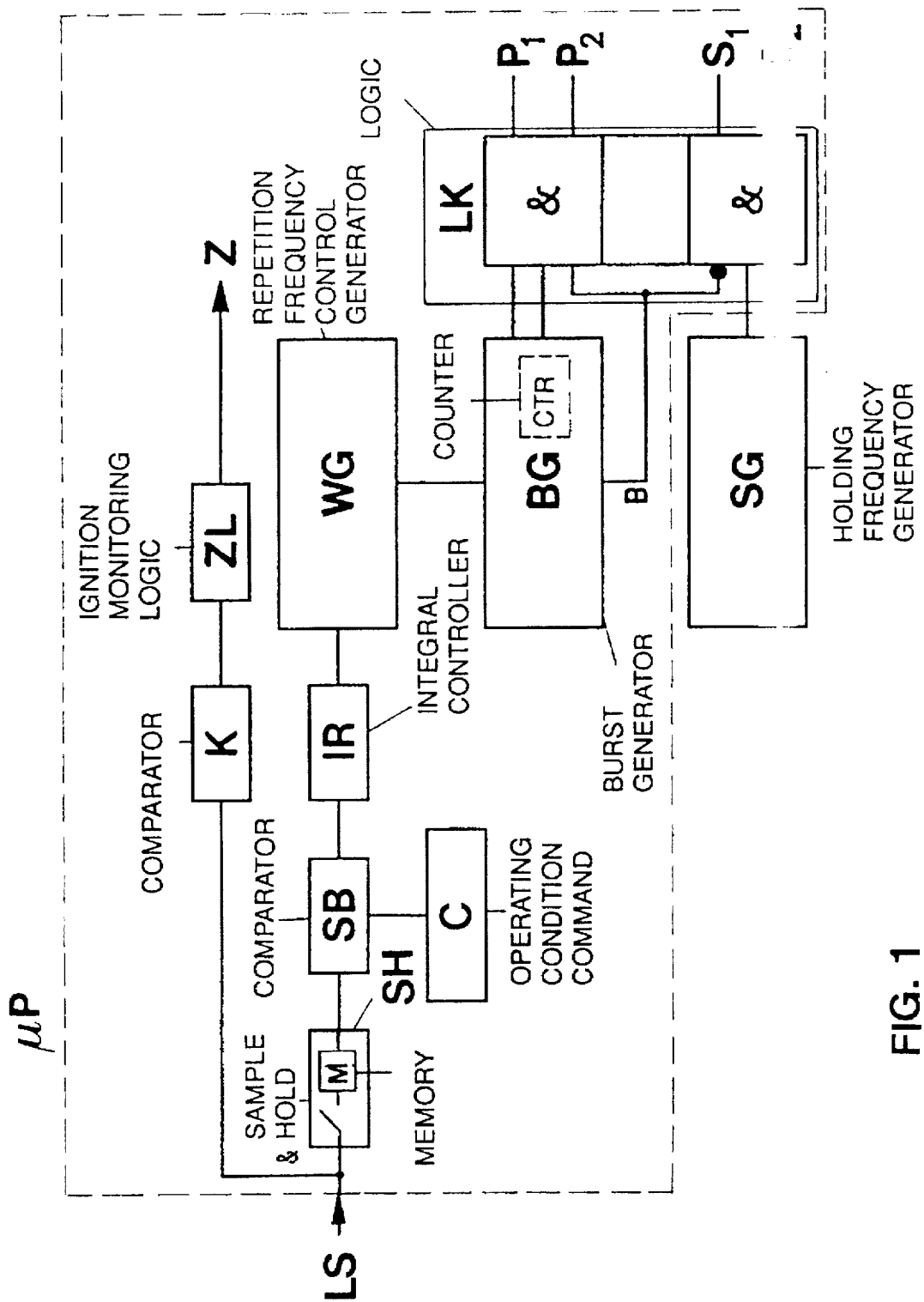
FIG. 1 is a highly schematic diagram illustrating the control circuit.

Referring now to FIG. 1: The main components of the control circuit are a burst generator BG, which generates the groups of signals to form together a burst which controls the power transistors T1, T2, as will appear more specifically below. This burst generator BG, in turn, is controlled by a repetition frequency control generator WG, which controls the repetition frequency of the bursts emitted by the burst generator BG which is a variable frequency generator. This, in effect, is a burst oscillator which generates the control signals for the power pulse phase of operation of the lamp.

The control circuit further includes a holding frequency generator SG which generates control signals for the holding phase of operation of the lamp. The burst generator BG and the holding frequency generator SG are controlled oscillators, connected over two connection lines each with a logic circuit LK. The logic circuit LK has two logically interconnected AND gates. An additional signal B is obtained from the burst generator BG. This signal B is active for the time duration of the bursts emitted by the burst generator BG and insures interlock of the signals from the burst generator BG and the holding frequency generator SG. The logic circuit LK, then, connects the respective control signals $P_1$, $P_2$ and $S_1$, $S_2$ from the burst generator and the holding frequency generator, respectively, to the similarly identified terminals on FIG. 2. Burst generator BG preferably includes a counter CTR counting oscillations of oscillator BG under control of signals from repetition control generator WG.

The repetition frequency control generator WG is interconnected and controlled by a sensing signal derived from terminal LS (FIG. 2), representative of lamp voltage, as described above. The signal LS is connected to a sample-and-hold circuit SH which, as shown schematically, includes a switch and a memory M; the circuit SH, in turn, is connected to a comparator, for example, in form of a subtracting circuit SB. The subtracting circuit or comparator SB receives a control input from an operating condition command source C. The comparator SB, thus, compares a sampled voltage with a command signal and provides an output representative of deviation of operation from the commanded signal to an integral controller IR which, in turn, controls the repetition frequency control generator WG which, typically, is an oscillator of variable frequency.

The individual elements shown can be constructed as oscillators or operational amplifiers, respectively. It is equally possible to implement the functions above described by a microprocessor. Since this is an additional element, not required, and controlling independently of the respective construction of the elements SH, SB, IR, etc., or an alternative element, it is shown in broken line. The individual functions described above can then be implemented by programmed algorithms in analog or digital form.

Figure 3:
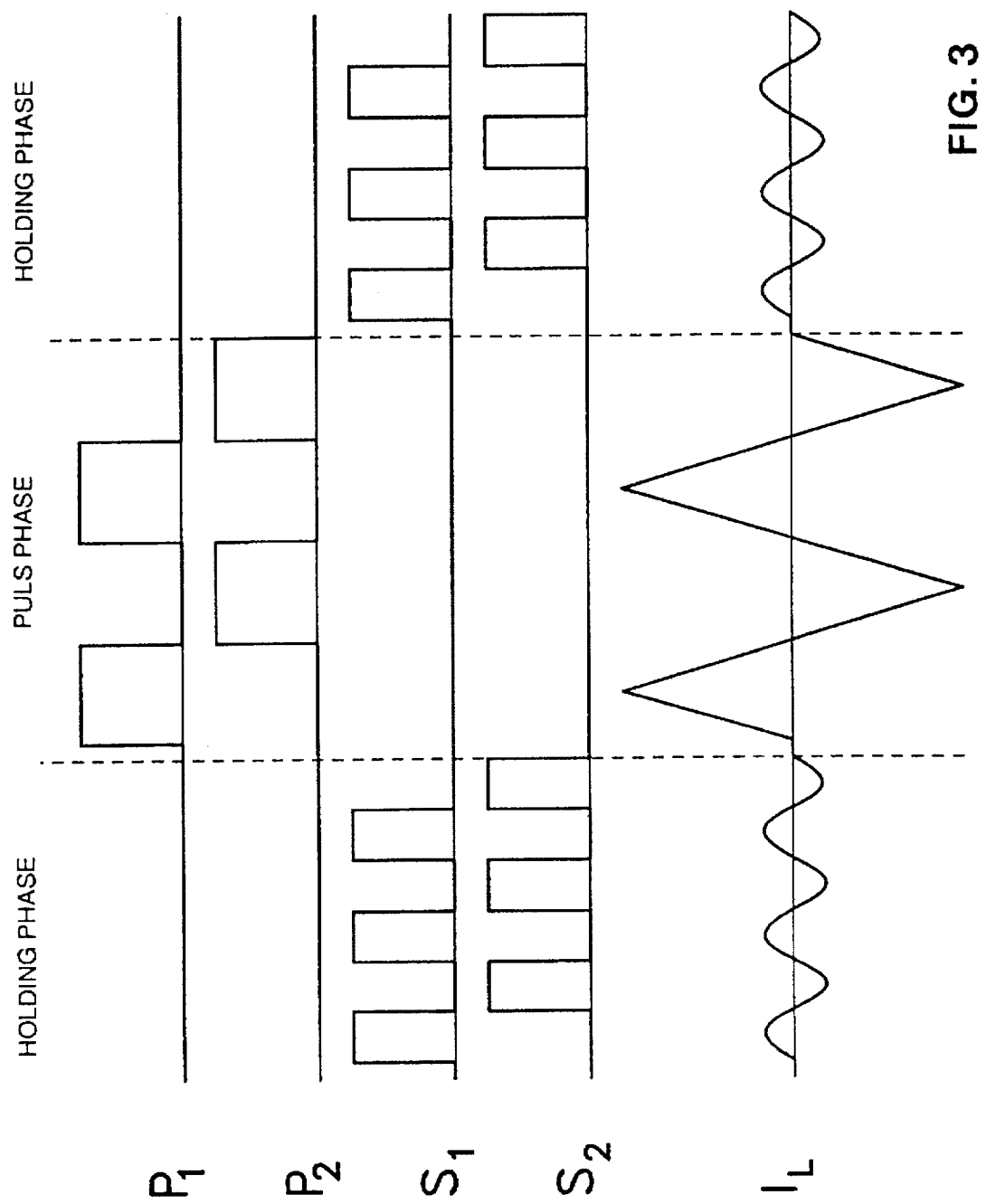
FIG. 3 is a schematic graph diagram illustrating, with respect to time, pulses and signals arising in the system of the present invention.

Operation, with reference to FIG. 3: FIG. 3 is a schematic representation with respect to a common time axis, of the signals at the terminals P1, T2 for the transistors T1, T2, generating the power pulses during the pulse phase of operation of the lamp; the terminals S1, S2, providing the holding phase frequencies for the lamp; and lamp current $I_L$ which arises based on control of the respective signals $P_1$, $P_2$, $S_1$, $S_2$. In FIG. 3, the holding pulses $S_1$, $S_2$ are not shown during the pulse phase since these signals have been suppressed by the logic circuit LK. The holding frequency generator, however, continues to oscillate even during the pulse phase of operation of the lamp.

The circuit of FIG. 1 also includes an alternative lamp starting circuit. The signal representative of lamp voltage available at terminal LS is applied to a comparator K which receives a predetermined reference REFER. Deviation of the sensed voltage signal from the predetermined reference beyond a predetermined limit is sensed by a ignition monitoring logic ZL which, in turn, is connected to the terminal Z (FIG. 2), in effect providing a pulse 2 to the ignition circuit 4, for example, for restarting the lamp. This provides for automatic control of the lamp from the circuit independently of an externally operable switch, such a switch S (FIG. 2).

Various changes and-modifications may be made within the scope of the inventive concept.

We claim:

1. A controlled pulse operating circuit system for a discharge lamp (E), fed from an alternating current (a-c) power network, wherein said circuit system supplies said lamp with sequentially occurring power pulses and holding pulses, to operate the lamp in sequential operating phases forming power phases and holding phases, comprising energy supply means (2) connectable to said a-c power network for providing d-c energy;

a first oscillator means (A1–T1; A2–T2) coupled to the lamp (E) for providing thereto intermittent bursts of power pulses interrupted by pauses;

a second oscillator means (A3–T3; A4–T4) coupled to the lamp for providing holding energy pulses during said pauses of the power pulses to the lamp;

a lamp ignition starting circuit (4) having a starting control means (SZ);

a sensing circuit (C4, R2) coupled to the first oscillator means and deriving a sensed signal representative of voltage applied to the lamp as supplied by the first oscillator means;

a controllable burst generator (BG) generating bursts of power burst control signals ($P_1$, $P_2$) of predetermined pulse duration to control the characteristics of the power pulses for the lamp;

a holding pulse generator (SG) continuously generating holding pulse control signals ($S_1$, $S_2$) of predetermined pulse duration to control the characteristics of the holding pulses for the lamp;

a repetition frequency control generator (WG) connected to and controlling the burst generator (BG) with respect to the repetition frequency of the bursts of the power burst control signals;

a logic circuit (LK) coupled to receive the power burst control signals from the burst generator (BG) and the holding pulse control signals from the holding generator (SG), and further being coupled and connected to control the first and second oscillators, respectively, and selectively and exclusively transmitting either the power burst control signals ($P_1$, $P_2$) from the burst generator or the holding pulse control signals ($S_1$, $S_2$) from the holding pulse generator (SG), in which the holding pulse control signals ($S_1$, $S_2$) are transmitted in the pauses between bursts of the power burst control signals ($P_1$, $P_2$);

a sample and hold circuit (SH) coupled to receive the sensed signals from said sensing circuit (C4, R2) and storing a signal value representative of sensed voltage occurring at a predetermined time instant in one of said operating phases of the lamp;

a comparator circuit (SB) coupled to receive the signal value from the sample-and-holding circuit (SH) and comparing said signal value with a command value, and providing an output control signal, said output control signal being coupled to and connected to the repetition frequency control signal (WG) upon deviation of the signal value from said command value;

whereby the logic circuit (LK) controls operation of the respective first and second oscillator means during the power phase and the holding phase operation of the lamp.

2. The system of claim 1, wherein said power burst control signals ($P_1$, $P_2$) and said holding pulse control signals ($S_1$, $S_2$, are essentially rectangular signals.

3. The system of claim 1, further including an integral controller (IR) connected between the comparator (SB) and the repetition frequency control generator (WG).

4. The system of claim 1, wherein the burst generator (BG) includes a controlled oscillator and a counter (CTR) counting the oscillations of the controlled oscillator and controlling the number of the oscillations of the controlled oscillator based on a count value in said counter, under control of the repetition frequency control generator (WG).

5. The system of claim 1, wherein the holding pulse generator (SG) comprises a controlled oscillator.

6. The system of claim 1, wherein the burst generator (BG) comprises a variable frequency oscillator.

7. The system of claim 1, wherein said logic circuit (LK) comprises an interconnected gate control logic.

8. The system of claim 1, wherein the sample-and-hold circuit (SH) comprises a controlled switch and a memory (M) coupled thereto.

9. The system of claim 3, wherein the integral controller (IR) comprises an operational amplifier or a digital integrator operating under control of a digital integrating algorithm.

10. The system of claim 1, further including ignition control means coupled to said lamp ignition starting circuit (4), said ignition control means comprising an ignition comparator (K), receiving a reference value and an ignition monitoring logic (ZL), said comparator being coupled to and controlled by said sensing circuit (C4, R2), and receiving said sensed signal, said ignition monitoring logic controlling the lamp ignition starting circuit upon deviation of the sensed signal from a predetermined reference value.

11. The system of claim 1, further including a microprocessor (µP) coupled to and controlling at least one of:

said controllable burst generator (BG);
said holding pulse generator (SG);
said repetition frequency control generator (WG);
said logic circuit (LK);
said sample-and-hold circuit (SH);
said comparator circuit (SB); and a second comparator (K) and an ignition monitoring logic (ZL) connected, respectively, to the sensing circuit (C4, R2) and the lamp ignition starting circuit (4);

and optionally, an integral controller (IR) connected between the comparator (SB) and the repetition frequency control generator (WG).

12. The system of claim 1, wherein said first oscillator means (A1–T1; A2–T2) comprises a first half-bridge oscillator having alternately switching transistors (T1, T2);

said second oscillator means (A3–T3, A4–T4) comprises a second half-bridge oscillator circuit having two alternately switching transistors (T3, T4);

a first current limiting inductance (L1) coupled between the lamp (E) and the first half-bridge oscillator;

a second current limiting inductance (L2) coupled between the lamp (E) and the second half-bridge oscillator; and a pair of serially connected capacitors (C1, C2), connected across the outputs of the first and second oscillators and having their common junction (M3) connected to the lamp (E).

13. The system of claim 1, wherein the means for providing d-c energy comprises a rectifier element (2).

14. The system of claim 1, wherein the first and second half-bridge oscillator circuits, respectively, define respective center junctions (M1, M2), said second current limiting inductance (L2) being connected between said center junctions (M1, M2); and wherein said sensing circuit (C4, R2) comprises a serially connected capacitor (C4) and a resistor (R2) circuit, said circuit being coupled to the center junction (M1) between the transistors (T1, T2) of the first half bridge.

15. A controlled operating power supply circuit for a discharge lamp (E) fed from an a-c power network wherein, in operation, said lamp is sequentially operated in a power pulse phase and a holding phase, comprising means (2) for providing d-c energy;

a first half-bridge oscillator circuit having two alternately switching transistors (T1, T2) for providing intermittently bursts of power pulses interrupted by pauses;

a second half-bridge oscillator circuit having two alternately switching transistors (T3, T4) for providing holding energy pulses during the pauses of the power pulses;

a first current limiting inductance (L1) coupled between the lamp (E) and a midjunction (M1) between the alternately switching transistors (T1, T2) of the first half-bridge oscillator;

a second current limiting inductance (L2) coupled between the lamp (E) and a second midpoint (M2) between the alternately switching transistors (T3, T4) of the second half-bridge oscillator;

a pair of serially connected capacitors (C1, C2) connected across the first and second oscillators and having their common junction (M3) connected to one electrode of the lamp (E);

a pulse ignition circuit (4) for igniting the discharge lamp, coupled to the lamp (E); and oscillator control signals (P1, P2, S1, S2) individually coupled to and controlling operation of the first half-bridge oscillator and second half-bridge oscillator, respectively, said oscillator control means controlling operation of said second half-bridge oscillator during the pauses between bursts of power pulses derived from the first half-bridge oscillator.

16. The power supply circuit of claim 15, wherein said pair of capacitors (C1, C2) are electrolytic capacitors.

17. The power supply circuit of claim 15, wherein the capacitors (C1, C2) of said pair of serially connected capacitors have essentially the same capacity value.

18. The power supply circuit of claim 15, wherein said pulse ignition circuit (4) is integrated in said pulse power supply circuit and comprises a series circuit formed by a breakdown element, a capacitor (C3) and an inductance (L1'), said series circuit being connected through a controllable connection.

19. The power supply circuit of claim 18, wherein said first current limiting inductance (L1) comprises an inductive element having a core;

and wherein the inductance (L1') of said series circuit comprises an additional winding on the core of said inductive element.

20. The power supply circuit of claim 15, further including a voltage sensing tap connection (LS), said voltage sensing tap connection comprising a capacitor element (C4) and a resistor element (R2) serially connected, one of said elements being coupled to a center or midjunction (M1) of the transistors of one of the first half bridges, to obtain a voltage proportional to lamp voltage at a terminal of said serial circuit.

21. The power supply circuit of claim 15, wherein said first current limiting inductance (L1) is serially connected between an electrode of the lamp (E) and a midjunction (M1) between the transistors (T1, T2) of the first half bridge; and the second current limiting inductance (L2) is connected between said first midpoint (M1) and a second midpoint (M2) between the transistors (T3, T4) of the second half bridge, whereby said first (L1) and second (L2) current limiting inductances are serially connected;

and wherein said pulse ignition circuit includes a winding (L1') inductively coupled to the first inductance, said additional winding (L1') having substantially lesser number of turns than said first current limiting inductance to provide for a voltage step-up effect.

22. A method of controlling a pulse operating circuit system for a discharge lamp (E) from an a-c power network, in which the discharge lamp operates in two phases, including intermittently occurring power pulse phases in which the lamp receives bursts of power pulses, and phases between the bursts of power pulses, in which the lamp receives holding energy pulses, said system having means (2) for providing d-c energy to the lamp (E);

a first oscillator means (A1–T1; A2–T2) coupled to the lamp for providing, intermittently, bursts of power pulses, interrupted by pauses there-between to the lamp;

a second oscillator means (A3–T3, A4–T4) coupled to the lamp for providing holding energy during the pauses of the power pulses; and a lamp ignition starting circuit (4) having a starting control means (S, Z), said method comprising the steps of sensing the voltage applied to the lamp during the holding energy phase in one of said lamp operating phases and deriving a sensed signal;

continuously generating holding energy pulses of predetermined pulse duration;

controlling the repetition frequency of generation of bursts of power pulses by said first oscillator means (A1–T1, A2–T2);

storing the sensed signal representative of said lamp voltage at an instant of time during said one of said operating phases of the lamp;

comparing said sensed signal with a command value;

controlling the repetition frequency of occurrence of said bursts, in accordance with said thus compared sensed signal with a command reference; and logically controlling the first oscillator means to provide said thus controlled bursts, and further logically controlling transmission of the continuously generated holding pulses to the second oscillator means only during said pauses between bursts of said power pulses.

23. The system of claim 1, wherein said lamp is a sodium high pressure discharge lamp.

24. The power supply circuit of claim 15, wherein said lamp is a sodium high pressure discharge lamp.

25. The power supply circuit of claim 18, wherein the breakdown element comprises a spark gap element (FS) or a semiconductor breakdown element (SIDAC).

\* \* \* \* \*